(12) United States Patent
Stottlemyer

(10) Patent No.: US 6,591,046 B2
(45) Date of Patent: Jul. 8, 2003

(54) METHOD FOR PROTECTING OPTICAL FIBERS EMBEDDED IN THE ARMOR OF A TOW CABLE

(75) Inventor: Thomas R. Stottlemyer, Mystic, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 74 days.

(21) Appl. No.: 09/874,952

(22) Filed: Jun. 6, 2001

(65) Prior Publication Data

US 2002/0186938 A1 Dec. 12, 2002

(51) Int. Cl.[7] .................................................. G02B 6/44
(52) U.S. Cl. ........................ 385/103; 385/100; 385/102; 385/104; 385/106; 385/107
(58) Field of Search ........................ 385/100, 102–104, 385/106, 107

(56) References Cited

U.S. PATENT DOCUMENTS

| | | | | |
|---|---|---|---|---|
| 4,317,000 A | * | 2/1982 | Ferer ......................... | 174/70 R |
| 4,365,865 A | * | 12/1982 | Stiles ........................ | 385/101 |
| 4,505,541 A | * | 3/1985 | Considine et al. .......... | 385/107 |
| 4,725,453 A | * | 2/1988 | Nakasone et al. ......... | 427/163.2 |
| 4,818,060 A | * | 4/1989 | Arroyo ....................... | 385/103 |
| 4,900,383 A | * | 2/1990 | Dursch et al. .............. | 156/184 |
| 4,952,012 A | * | 8/1990 | Stamnitz .................... | 385/101 |
| 4,956,039 A | * | 9/1990 | Olesen et al. ............... | 156/180 |
| 5,126,167 A | * | 6/1992 | Matsuno et al. .......... | 427/163.2 |
| 5,127,975 A | * | 7/1992 | Zackrisson et al. ......... | 156/171 |
| 5,212,755 A | * | 5/1993 | Holmberg .................... | 385/107 |
| 5,259,055 A | * | 11/1993 | Cowen et al. .............. | 385/100 |
| 5,440,660 A | * | 8/1995 | Dombrowski et al. ...... | 385/102 |
| 6,284,082 B1 | * | 9/2001 | Schuler et al. .............. | 156/190 |

FOREIGN PATENT DOCUMENTS

| | | | | |
|---|---|---|---|---|
| JP | 60060610 A | * | 4/1985 | .......... G02B/06/44 |
| JP | 04025809 A | * | 1/1992 | .......... G02B/06/44 |
| JP | 06167643 A | * | 6/1994 | .......... G02B/06/44 |

* cited by examiner

*Primary Examiner*—Brian Healy
*Assistant Examiner*—Daniel Petkovsek
(74) *Attorney, Agent, or Firm*—James M. Kasischke; Jean-Paul A. Nasser; Michael F. Oglo

(57) ABSTRACT

A method is disclosed for protecting optical fibers embedded in the armor of a tow cable. The method includes the steps of winding a resin-impregnated fiber onto a stainless steel tube, and curing the resin to form a hard protective filament shell around the stainless steel tube. The fiber is a continuous fiber and the step of impregnating is either in combination with the step of winding or prior to the step of winding. The fiber used is any one of a carbon fiber, a Kevlar™ fiber, a boron fiber or the like. The winding is either applied during formation of the steel tube or subsequent to formation of the steel tube. The method further comprises the step of winding galvanized steel armor wires of a predetermined diameter around the tow cable core to form the tow cable and helixing the protected tube amongst the galvanized steel armor wires.

19 Claims, 1 Drawing Sheet

METHOD FOR PROTECTING OPTICAL FIBERS EMBEDDED IN THE ARMOR OF A TOW CABLE

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED PATENT APPLICATIONS

Not applicable.

BACKGROUND OF THE INVENTION (1) Field of the Invention

This invention generally relates to a method and device for protecting optical fibers embedded in the armor of a tow cable. More particularly, the invention relates to the protection of the optical fibers within a tubular housing, such that incorporation of the protected optical fibers and tubing into the armor of a tow cable will prevent damage to the fibers.

(2) Description of the Prior Art

The current art for protecting optical fibers used in a tow cable is to house the optical fibers within a stainless steel tube.

An example of the prior art is shown in FIG. 1 as including a stainless steel tube 30 and optical fibers 32 housed within the stainless steel tube. The arrangement of FIG. 1 is that which is currently used in tow cables which require optical fibers. Tube 30 and optical fiber 32 combination may be used in the center of a cable core (not shown) or helixed in among electrical conductors (not shown). However, the stainless steel tube 30, as currently manufactured, has a fairly thin wall and may not survive the contact stresses imposed by the galvanized steel armor strength wires (if the tube were located among the armor wires) as loads are imposed on the tow cable.

Thus, it has been discovered that a problem exists in the art whereby it is necessary to further protect the stainless steel tube in order to completely protect the optical fibers, particularly when the optical fibers are embedded in the armor wires of a tow cable. Although it might be thought that an increase to the thickness of the wall of the stainless steel tube would provide the protection needed, such is not the case. Due to the laser-welding process that is used to manufacture the tube, it may not be possible to increase the thickness to protect sufficiently the fibers from the stresses imposed during towing.

Holmberg's patent (U.S. Pat. No. 5,212,755) describes the method for placing a stainless steel tube among the armor wires in a tow cable, with optical fibers inside the stainless steel tube. Ruffa has extended this idea in a patent application which has embedded sensors along the length of the optical fibers to make measurements (temperature, strain, etc.).

The following patents, for example, disclose various types of protection of optical fibers, but do not disclose the protection of optical fibers housed within a stainless steel tube, the optical fibers being embedded in the armor of a tow cable, as does the present invention.

U.S. Pat. No. 4,818,060 to Arroyo;
U.S. Pat. No. 4,952,012 to Stamnitz;
U.S. Pat. No. 4,971,420 to Smith;
U.S. Pat. No. 5,212,755 to Holmberg;
U.S. Pat. No. 5,259,055 to Cowen;
U.S. Pat. No. 5,440,660 to Dombrowski et al.; and
U.S. Pat. No. 6,041,153 to Yang.

Specifically, Arroyo discloses a flame and smoke resistant optical fiber cable having a relatively small diameter. The cable includes a core comprising a ribbon array or a plurality of individual fibers and a sheath system. The sheath system includes an impregnated fiber glass tape which has been wrapped about the core. The tape is impregnated with a solution system which comprises a micaceous constituent, a fluoropolymer constituent and a lubricant such as silicone. The impregnated system provides the tape and hence the cable with unexpectedly superior fire retardation and smoke resistance properties so that the cable is suitable for plenum and riser use. An all dielectric strength member system is disposed between the tape and a plastic jacket.

The patent to Stamnitz discloses an electro-opto-mechanical cable including at least one thinwall steel alloy tube containing at least one single mode fiber and a void filling gel to assure the capability for transmitting low-noise optical phase data. A dielectric annulus and an electrically conductive layer disposed therein helps further assure water-tight integrity and power or electrical signal transfer. An optional double-layer contrahelical or three or four layer, torque balanced, steel wire strength member provides additional protection as well as capability to be towed, deployed and recovered from the seafloor at abysmal depths. The steel armor and cable core interface eliminates all intersticial spaces associated with the armor wires to produce a firm, hard cable that experiences minimal residual strain (creep) due to extensive load cycling. A pressure extruded outer jacket aids in assuring the protection of the individual steel wires from point loadings and from strength degradation due to corrosion. Further, the integral steel armor and jacket structure provides protection for the electro-optic core from abrasion against rock or coral at cable suspension points during sustained cable strumming.

Smith discloses an optical fiber cable especially for submarine use and has a core surrounded by a layer of strength members which include both wires and laser-welded metallic tubes containing the optical fibers.

Holmberg discloses an armored fiber optic cable having both optical fibers and armor wires located outside the cable core in position where the fiber optics experience low strains when the cable is under axial stress. In one embodiment, metal armor wires and optical fibers embedded in metal tubes are arrayed in one or more layers about and outside the cable core. In another embodiment, KEVLAR™ armor wires and optical fibers embedded within a hard composite shell are arrayed in one or more layers about and outside the cable core, and a layer of KEVLAR™ armor is provided surrounding the one or more layers. Holmberg does not use a composite shell for the steel tube as is done in the present invention.

The patent to Cowen et al. discloses a fiber optic microcable having a uniform cross sectional dimension which may be manufactured in continuous lengths that exceed 10 kilometers. The microcable is comprised of an optical fiber core, a buffer surrounding the core, and a protective sheath surrounding the buffer consisting of an electromagnetic radiation-cured resin impregnated with fibers suspended in the resin to enhance the resistance of the microcable to physical damage. The microcable is fabricated by soaking the fibers in an electromagnetic radiation-curable resin, placing the wetted fibers around the core and buffer to form a matrix, and then irradiating the matrix with electromagnetic radiation to cure the resin.

Dombrowski et al. discloses a fiber-reinforced optical microcable comprised of a buffered optical waveguide coated with a fiber-reinforced protective sheath made of a fiber-reinforced, ultraviolet light-cured resin over which is formed an ultraviolet light-cured resin overcoat. The protective sheath is manufactured by soaking reinforcing fibers in the UV-curable resin, placing the wetted fibers around the buffered optical waveguide, feeding both the fibers and buffered optical waveguide through a die, and curing the resin with ultraviolet light. Then, an ultraviolet light-cured resin is flow-coated over the protective sheath and cured with ultraviolet light to complete the microcable.

The patent to Yang discloses a composite-reinforced buffer tube for an optical fiber cable. The composite reinforced buffer tube comprises an extruded elongated thermoplastic matrix having an elongated, substantially continuous, reinforcement incorporated therein along its length between its inside and outside walls. The substantially continuous reinforcing is co-extruded with the elongated thermoplastic matrix and bonded to the matrix at interface regions therebetween. The material forming the reinforcement has a higher modulus of elasticity than the material forming the thermoplastic matrix, and the reinforcement material has a coefficient of thermal expansion that is less than that of the thermoplastic matrix material. The strength properties of the buffer tube can be tailored by the size, shape and positioning of the co-extruded reinforcement as well as the number of reinforcements.

It should be understood that the present invention would in fact enhance the functionality of the above patents by providing a method for further protecting the optical fiber housed within a steel tube, particularly when the tube and fiber are embedded in the armor of a tow cable.

SUMMARY OF THE INVENTION

Therefore, it is an object of this invention to provide a method for protecting a fragile material housed within a tube.

Another object of this invention is to provide a method for protecting optical fibers housed within a steel tube.

Still another object of this invention is to provide a method for protecting optical fibers housed within a steel tube by providing a filament winding process in connection therewith.

A still further object of the invention is to provide a method for protecting optical fibers housed within a steel tube, the steel tube having a resin soaked continuous filament wound therearound, followed by curing of the resin.

Yet another object of this invention is to provide a method for protecting the optical fibers housed within a steel tube, such that the protected steel tube may be embedded in the armor of a tow cable.

In accordance with one aspect of this invention, there is provided a method for protecting optical fibers embedded in the armor of a tow cable. The method includes the steps of impregnating a fiber with a resin, winding the fiber onto a stainless steel tube, and curing the resin to form a hard protective filament shell around the stainless steel tube. The fiber is a continuous fiber and the step of impregnating is either in combination with the step of winding or subsequent to the step of winding. The fiber used is any one of a carbon fiber, a Kevlar™ fiber, a boron fiber or the like. The winding is either applied during formation of the steel tube or subsequent to formation of the steel tube. The method further comprises the step of winding galvanized steel armor wires of a predetermined diameter around the tow cable core to form the tow cable and helixing the protected tube amongst the galvanized steel armor wires.

BRIEF DESCRIPTION OF THE DRAWINGS

The appended claims particularly point out and distinctly claim the subject matter of this invention. Various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

In general, the present invention is directed to a method for protecting optical fibers embedded in the armor of a tow cable. More specifically, the present invention is directed to the protection of the optical fibers housed in a tube which is ultimately helixed in among the armor wires of a tow cable.

Figure 1:
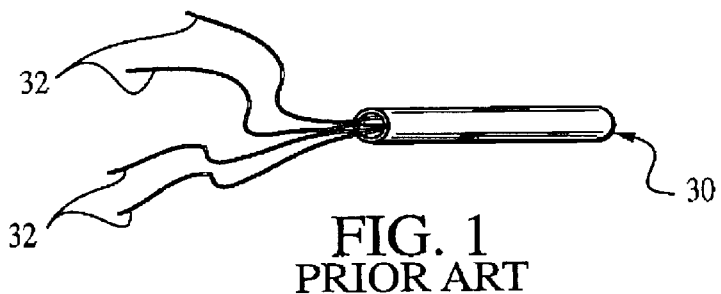
FIG. 1 is a perspective view of a Prior Art device.
Figure 2:
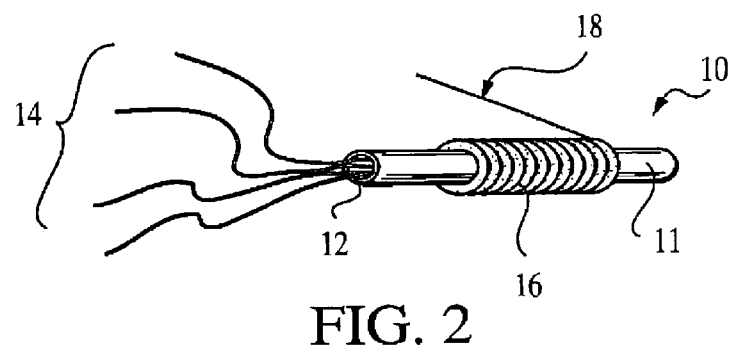
FIG. 2 is a perspective view of a preferred embodiment of the present invention.

Referring now to FIG. 2, the details of the present invention will be more fully explained which shows the elements of a protective tube 10 which has a longitudinal opening 12 therethrough. A plurality of optical fibers 14 are laid in the tube as it is being laser welded in a known manner and are shown at the opening 12 of the tube 10.

Stainless steel tube 10 is covered with a composite material 16 using a filament winding process. The filament winding process is that in which a continuous fiber 18 is wound around the tube 10 as the fiber 18 is being impregnated with a resin.

Many types of fibers 18 may be used for this process, including for example, carbon fiber, Kevlar™ fiber, or boron fiber. Once the resin soaked fiber 18 has cured, the composite material 16 forms a very strong cylindrical shell around the stainless steel tube 10.

Figure 3:
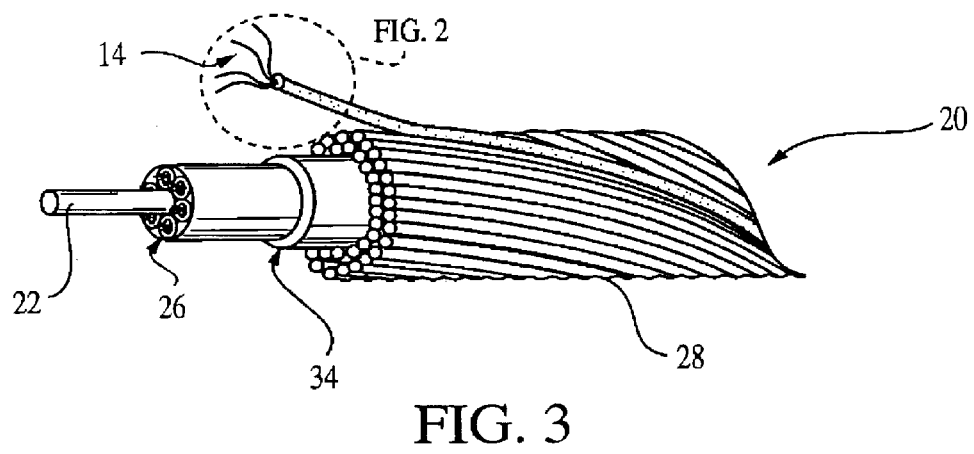
FIG. 3 is perspective view of the preferred embodiment of the present invention incorporated into a tow cable.

An example of the ultimate use for the protected stainless steel tube 10 housing the optical fibers 14 includes the use shown in FIG. 3. In particular, FIG. 3 illustrates a tow cable 20 such as that used in the Navy for towing objects and communicating between the towed object and the towing vessel. Tow cable 20 includes elements such as a plastic rod or stainless steel tube 22 with optical fibers. Electrical conductors 26 are shown surrounding the plastic rod 22. A watertight plastic jacket 34 surrounds the electrical conductors 26 and galvanized steel armor wires 28 surround the cable to provide towing strength. Protected tube 10 of FIG. 2 is shown helixed in among the armor wires 28. The composite material 16 obtained by the filament winding process protects the tube 11 from the high stresses imposed by the galvanized steel armor wires 28 adjacent to it. Such protection of the optical fibers 14 within the helixed stainless steel tube has not heretofore been obtained.

It should be understood that the materials such as the stainless steel of the tube or the content of the protective tube 11 may be varied and that such alterations do not affect the scope of the invention.

Further, it is anticipated that the exact process of applying the resin to the fiber 18 may be a process that occurs prior to the winding of the fiber 18 onto the steel tube 11. Also, a process could be created whereby the filament winding is done as the stainless steel tube 11 is being manufactured. A significant benefit is that the stainless steel tubes are generally manufactured in standard sizes, and through the filament winding process, the diameter of the tube 11 could be built-up to match the diameter of the galvanized steel armor wires 28 in that layer of the tow cable 20. The tube and fibers 18 are better protected if the diameter of the resin coated fiber 18 matches the diameter of the steel armor wires 28 (i.e., the tube is locked in place and is loaded evenly).

Accordingly, the invention provides protection to the optical fibers 14 in an electro-optical-mechanical tow cable 20. In fact, the invention could provide substantial improvements in the way that temperature profile is measured in the ocean, which enhances sonar performance. The optical sensors are well protected in the armor of the tow cable and will survive the loads imposed by towing and handling, yet they are located near the water where temperature must be measured. By filament winding a resin soaked fiber around the stainless steel tube and then curing the resin, the optical fibers are better protected than they have been in the past, thereby improving the sensor measurements and the sonar performance.

Accordingly, the inventor has discovered a method for protecting the optical fibers that are enclosed in a stainless steel tube, and helixed into the armor wires of an electro-optical-mechanical tow cable.

In view of the above detailed description, it is anticipated that the invention herein will have far reaching applications other than those of tow cables.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A method for protecting contents of a tube member comprising the steps of:
   winding a fiber around said tube member during the formation of said tube member;
   impregnating said fiber with a resin; and
   curing said resin so as to form a hard shell of impregnated fiber around said tube.

2. The method according to claim 1 wherein said fiber is a continuous fiber.

3. The method according to claim 1 wherein said step of impregnating is in combination with said step of winding.

4. The method according to claim 1 wherein said step of winding is prior to said step of impregnating.

5. The method according to claim 1 wherein the contents of said tube are optical fibers.

6. The method according to claim 1 wherein said tube is a stainless steel tube.

7. The method according to claim 1 wherein said fiber is a carbon fiber.

8. The method according to claim 1 wherein said fiber is a Kevlar™ fiber.

9. The method according to claim 1 wherein said fiber is a boron fiber.

10. A method for protecting contents of a stainless steel tube comprising the steps of:
    winding a fiber onto said tube during the formation of said tube;
    impregnating said fiber with a resin; and
    curing said resin.

11. The method according to claim 10 wherein said step of curing said resin is to form a hard shell of filament around said tube.

12. The method according to claim 10 wherein said fiber is a continuous fiber.

13. The method according to claim 10 wherein said step of impregnating is in combination with said step of winding.

14. The method according to claim 10 wherein said step of winding is prior to said step of impregnating.

15. The method according to claim 10 wherein the contents of said tube are optical fibers.

16. The method according to claim 10 wherein said fiber is a carbon fiber.

17. The method according to claim 10 wherein said fiber is a Kevlar™ fiber.

18. The method according to claim 10 wherein said fiber is a boron fiber.

19. A method for protecting contents of a stainless steel tube comprising the steps of:
    winding a fiber onto said tube during the formation of said tube;
    impregnating said fiber with a resin;
    curing said resin;
    winding galvanized steel wires of a predetermined diameter along with said impregnated fiber covered tube around a second tube wherein said impregnated fiber covered tube corresponds in diameter to said galvanized steel wires.

* * * * *